US012704183B2

(12) United States Patent
Gernstl

(10) Patent No.: US 12,704,183 B2

(45) Date of Patent: Aug. 11, 2026

(54) DETENTED SELECTABLE VARIABLE ORIFICE

(71) Applicant: Eaton Intelligent Power Limited, Dublin (IE)

(72) Inventor: Adam Jon Gernstl, Akron, NY (US)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 18/798,413

(22) Filed: Aug. 8, 2024

(65) Prior Publication Data

US 2025/0075799 A1 Mar. 6, 2025

Related U.S. Application Data

(60) Provisional application No. 63/579,273, filed on Aug. 28, 2023.

(51) Int. Cl.

| | |
|---|---|
| ***F16K 5/04*** | (2006.01) |
| ***F16K 1/54*** | (2006.01) |
| ***F16K 3/26*** | (2006.01) |
| ***F16K 3/34*** | (2006.01) |
| ***F16K 5/12*** | (2006.01) |
| ***F16K 27/06*** | (2006.01) |
| ***F16K 35/04*** | (2006.01) |

(52) U.S. Cl.

CPC ................ *F16K 1/54* (2013.01); *F16K 3/262* (2013.01); *F16K 3/34* (2013.01); *F16K 5/0442* (2013.01); *F16K 5/12* (2013.01); *F16K 27/065* (2013.01); *F16K 35/04* (2013.01)

(58) Field of Classification Search

CPC ... F16K 3/24; F16K 3/262; F16K 3/34; F16K 5/0442; F16K 5/04; F16K 5/12; F16K 35/04; F16K 27/065

See application file for complete search history.

(56) References Cited

U.S. PATENT DOCUMENTS

2024/0325675 A1* 10/2024 Dharmadasa ....... A61M 16/201

FOREIGN PATENT DOCUMENTS

| | | | | |
|---|---|---|---|---|
| CN | 205937917 U | 2/2017 | | |
| CN | 111075944 A | 4/2020 | | |
| DE | 20 2006 018 973 U1 | 5/2007 | | |
| WO | WO-2015123965 A1 * | 8/2015 | .......... | F16K 11/0833 |
| WO | WO-2023017256 A1 * | 2/2023 | .......... | A61M 16/201 |

OTHER PUBLICATIONS

Great Britain Search Report for Application No. 2412246.7 mailed Feb. 18, 2025.

* cited by examiner

*Primary Examiner* — Kelsey E Cary

(74) *Attorney, Agent, or Firm* — Merchant & Gould P.C.

(57) ABSTRACT

Disclosed herein is a selectable variable orifice valve having a detent configuration that allows for selection of various preset flow rates through the valve. The detent configuration as described herein includes one or more ramped teeth that are configured to fit into one or more ramped slots, and the slots are located so as to correspond to a predetermined flow rate setting of the valve. Each flow rate setting of the valve corresponds to an amount of a flow path of a valve member that aligns with an open flow path of a valve body. The valve configuration as described herein may be adjusted with or without application of an axial pressure.

17 Claims, 12 Drawing Sheets

DETENTED SELECTABLE VARIABLE ORIFICE

CROSS-REFERENCE TO RELATED APPLICATIONS

This application claims the benefit of U.S. Provisional Patent Application No. 63/579,273, filed Aug. 28, 2023, which is incorporated by reference herein in its entirety.

STATEMENT OF FEDERALLY SPONSORED RESEARCH OR DEVELOPMENT

This invention was made with government support under Contract No. FA8672-19-D-003 awarded by the United States Department of the Navy. The government has certain rights in the invention.

BACKGROUND OF THE INVENTION

In some systems, there is a need for a repeatable valve with a selectable flow orifice that allows for the amount of flow through the valve to be changed (i.e. restricted or increased) based on changing needs of the system. Such valves may be subject to harsh, adverse environmental conditions such as high pressures, G-forces, impacts, and/or vibrations, which require a valve that can handle such conditions while maintaining the selected flow rate position. In situations where the flow rate is selected manually, if the valve is difficult or nonintuitive to adjust or set, there is a risk that a user may inadvertently damage or misuse the valve or a tool used to adjust the valve. Existing designs may utilize a ball detent apparatus, which are prone to migrating from their set position over time, especially when subjected to harsh environmental conditions such as vibrations.

SUMMARY OF THE INVENTION

Disclosed herein is a valve having a detent configuration that allows for selection of various preset flow rates through the valve. The detent configuration as described herein includes one or more ramped teeth that are configured to fit into one or more ramped slots, and the slots are located so as to correspond to a predetermined flow rate setting of the valve. Each flow rate setting of the valve corresponds to an amount of a flow path of a valve member that aligns with an open flow path of a valve body. The valve configuration as described herein may be adjusted with or without application of an axial pressure, thereby reducing inadvertent damage by users manually adjusting the valve. The described valve configuration also includes a biasing element, which, along with the configuration of the teeth and slots, helps to ensure that the selected flow orifice position will be maintained once set, even if the valve is subject to harsh environmental conditions such as high pressures, G-forces, impacts, and/or vibrations.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
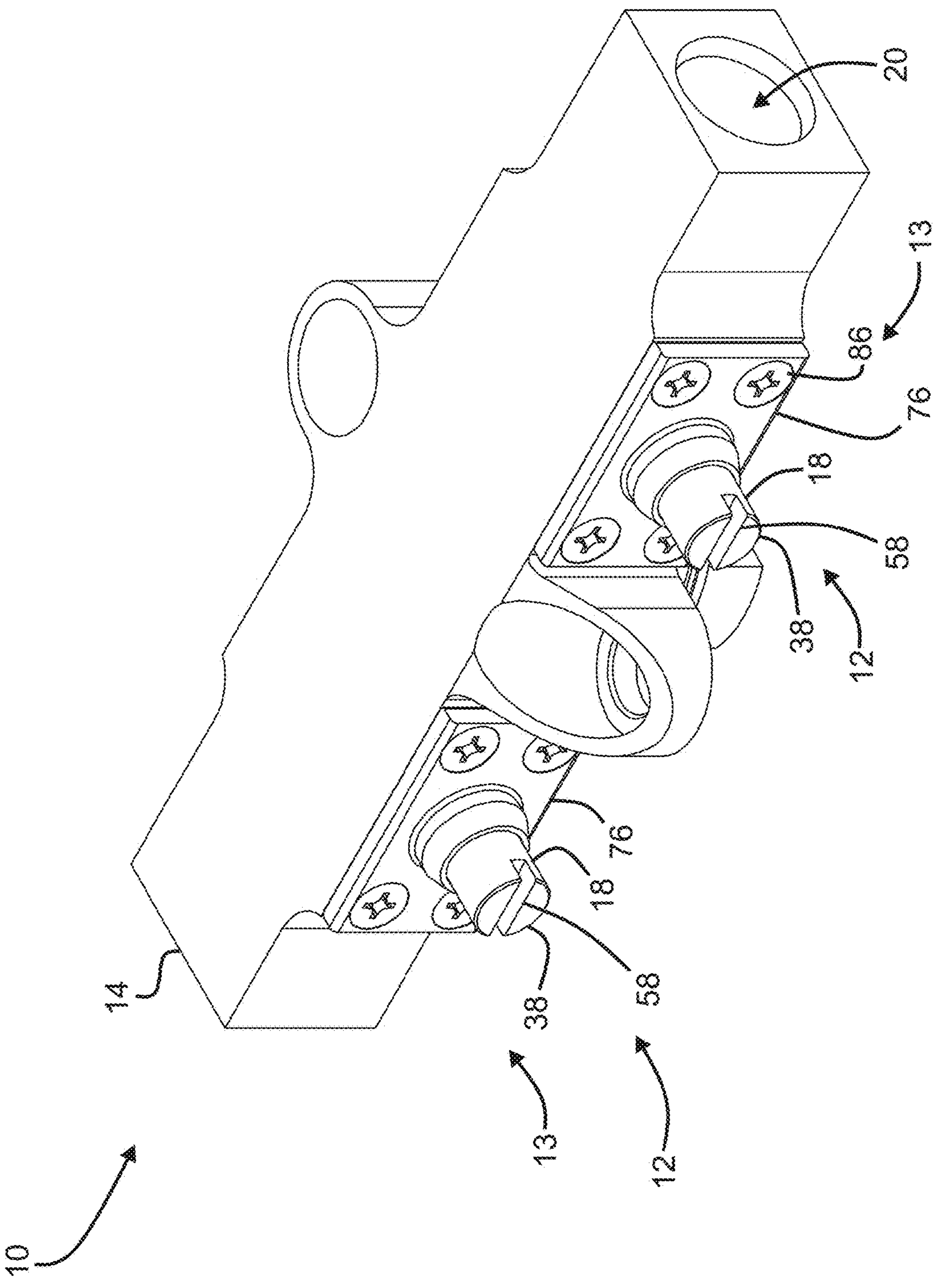
FIG. 1 depicts a top perspective view of a valve assembly including multiple valves, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. The following detailed description is therefore not to be taken in a limiting sense, and the scope of the present disclosure is defined by the appended claims and their equivalents.

In some systems, there is a need for a repeatable valve with a selectable flow orifice that allows for the amount of flow through the valve to be changed (i.e., restricted or increased) based on changing needs of the system, as more flow or less flow may be desired. Such valves may be subject to harsh, adverse environmental conditions such as high pressures, G-forces, impacts, and/or vibrations, which require a valve that can handle such conditions while maintaining the selected flow rate position. Disclosed herein is a valve having a detent configuration that allows for selection of various preset flow rates through the valve. Each flow rate setting of the valve corresponds to an amount of a flow path of a valve member that aligns with an open flow path of a valve body. The described valve configuration also includes a biasing element, which, along with the configuration of the teeth and slots as described herein, helps to ensure that the selected flow orifice position will be maintained once set, even if the valve is subject to harsh environmental conditions such as high pressures, G-forces, impacts, temperature fluctuations, and/or vibrations.

In situations where the flow rate is selected manually, if the valve is difficult or nonintuitive to adjust or set, there is a risk that a user may inadvertently damage or misuse the valve or a tool used to adjust the valve. For example, if a valve is configured so that a familiar rotational hand tool may be used to adjust it from one flow rate to another (for example, a screwdriver, wrench, channel locks, or pliers), a user may assume that in order to adjust the valve, all he or she needs to do is rotate the tool as in normal operation of the tool. If the particular valve, unbeknownst to the user, also requires to be pushed or pulled with the tool (i.e. requires an axial force to be applied by the user), the user may become frustrated when rotational motion alone does not result in adjustment of the valve, and may (possibly thinking that the valve is stuck or that more force is required) apply excess rotational force, leading to damage of the valve and/or the tool. The valve as described below includes one or more ramped teeth that are configured to fit into one or more ramped slots, and the slots are located to correspond to a predetermined flow rate setting of the valve, and the configuration of these features allows the valve disclosed herein to be adjusted without requiring application of an axial force. The configuration also allows for adjustment of the valve when an axial force is applied without damaging the valve.

These and other examples will be explained in more detail below with respect to FIG. 1 to FIG. 18. While some figures will be referenced specifically below for case of reference, in general, FIG. 1 to FIG. 17 are described concurrently herein and not all components described may be visible in each of FIG. 1 to FIG. 17.

Figure 2:
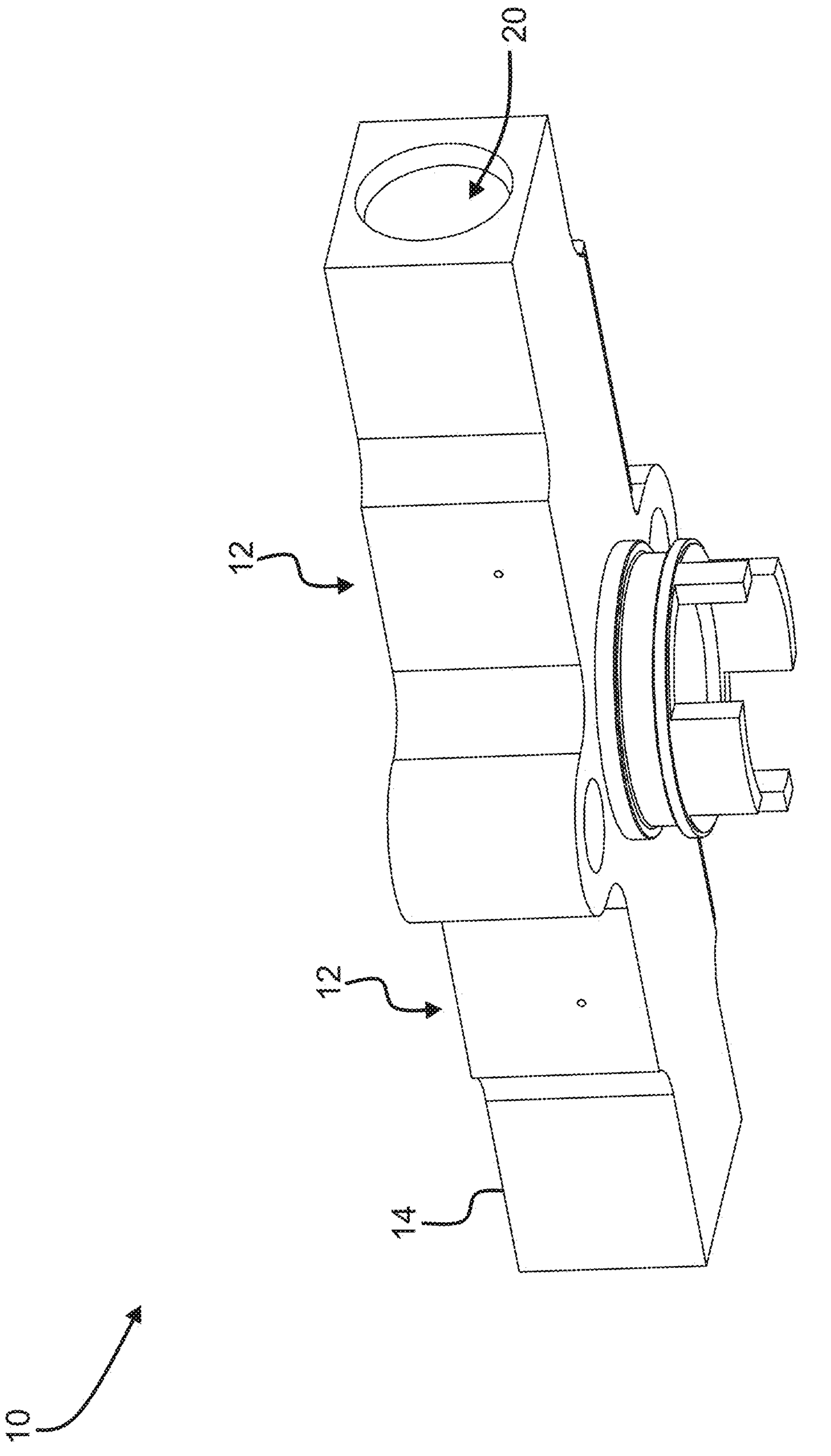
FIG. 2 depicts a bottom perspective view of the valve assembly of FIG. 1.

FIG. 1 depicts a top perspective view of a valve assembly 10 including multiple valves 12, and FIG. 2 depicts a bottom perspective view of the valve assembly 10. In some examples, a valve assembly 10 is connected to part of a larger system or device that requires a valve that can provide repeatable variable flow rate adjustment. In some examples, valve assembly 10 includes one, two, or greater than two valves 12, and the number of valves 12 is not limited to the particular example illustrated by FIG. 1. Each valve 12 includes a housing 13 and a valve member 18. Housing 13 may include a body 14 of the valve 12 and a detent plate 76 connected to the body 14. The body 14 may be individual to each valve 12 in some examples. In some examples, the body 14 may be shared as a manifold between two or more valves 12. The body 14 has at least one flow passage 20 (for example, a hole, bore, tube, pipe, channel, or other type of flow passage) that a fluid (e.g., a liquid or a gas) may pass through.

The valve member 18 (for example, a rod, pin, cylinder, or other appropriate member type) may sit partially within a cavity 28 of the body 14, and an actuated end 38 of the valve member 18 may partially extend from/protrude out of the body 14. The detent plate 76 includes a rod opening 82 that allows the actuated end 38 of the valve member 18 to protrude through the plate 76 as the plate 76 is connected to the body 14. In some examples, the plate 76 may be removably connected to the body 14 (for example, by screws, bolts, or another fastener means; or by removable connections such as a threaded connection or pressure fit connection). In some examples, the plate 76 may be connected to the body by welding, gluing, soldering, or other means. In the particular example shown (reference also FIG. 5 and FIG. 6), the plate 76 includes one or more fastener openings 84 to allow the passage through of fasteners (for example, screws) 86. In such an example, body 14 has features to connect with the fasteners 86.

Figure 3:
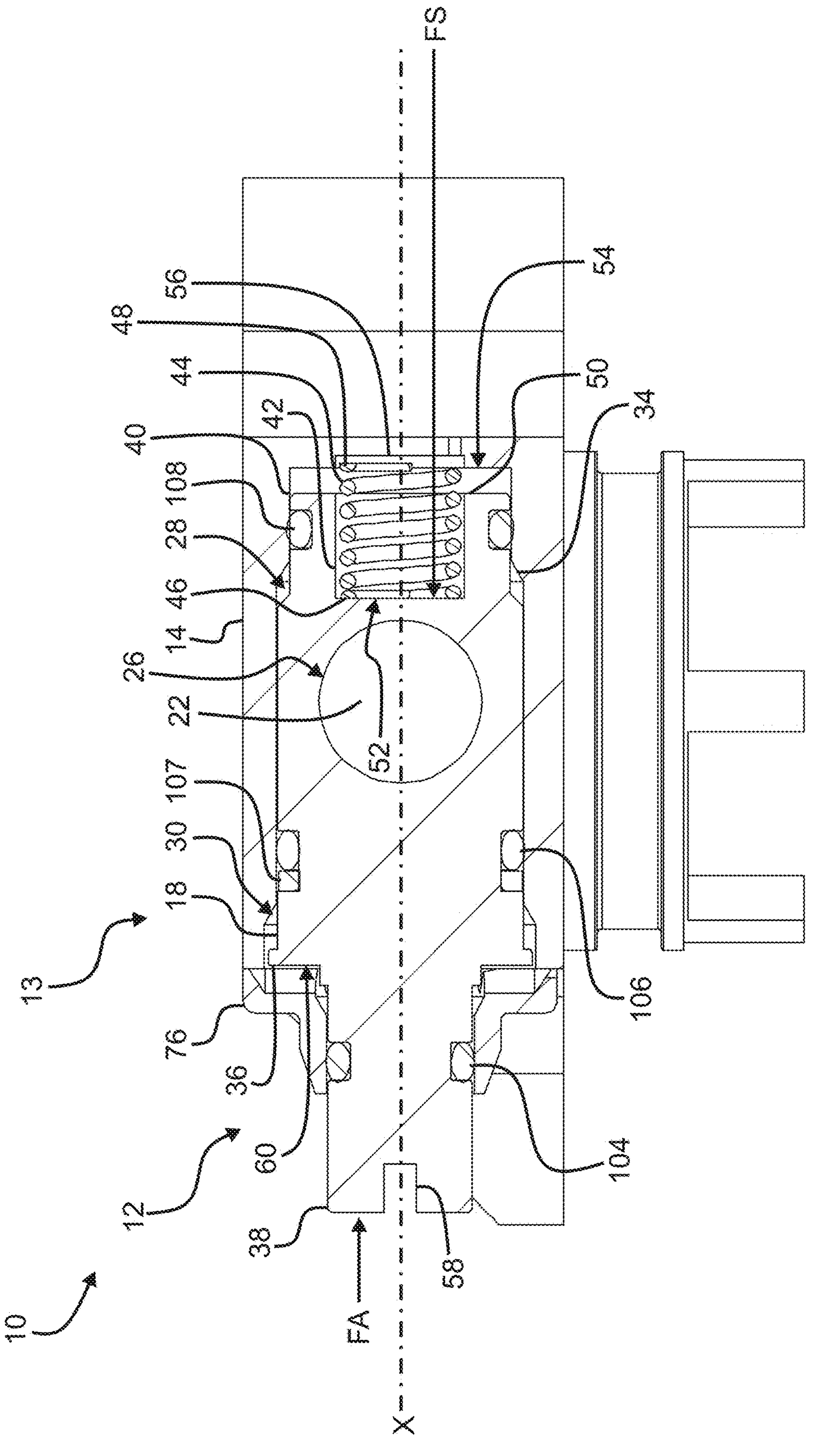
FIG. 3 depicts a vertical cross-sectional view of a valve of the valve assembly of FIG. 1.
Figure 4:
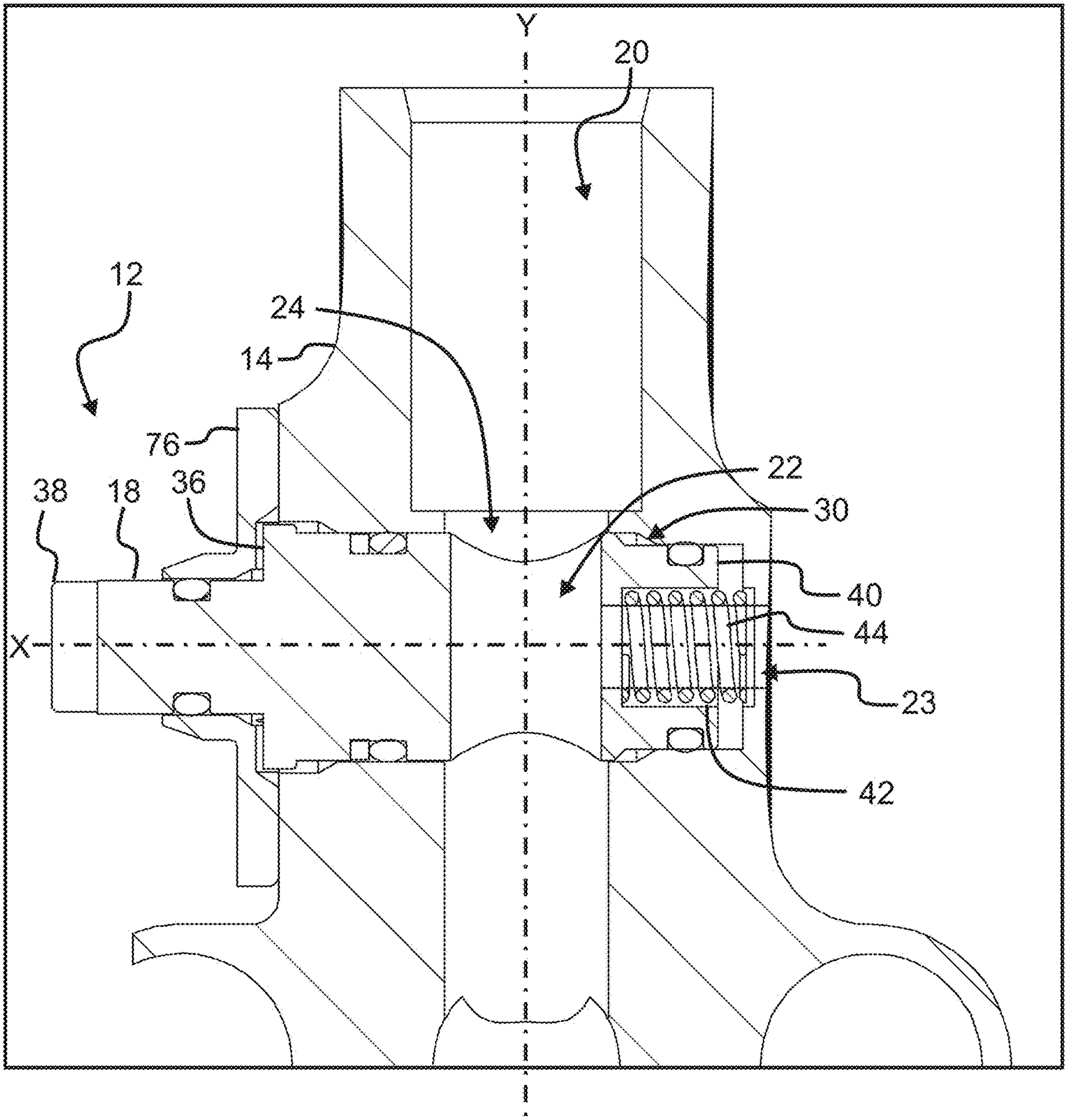
FIG. 4 depicts a horizontal cross-sectional view of a valve of the valve assembly of FIG. 1.
Figure 5:
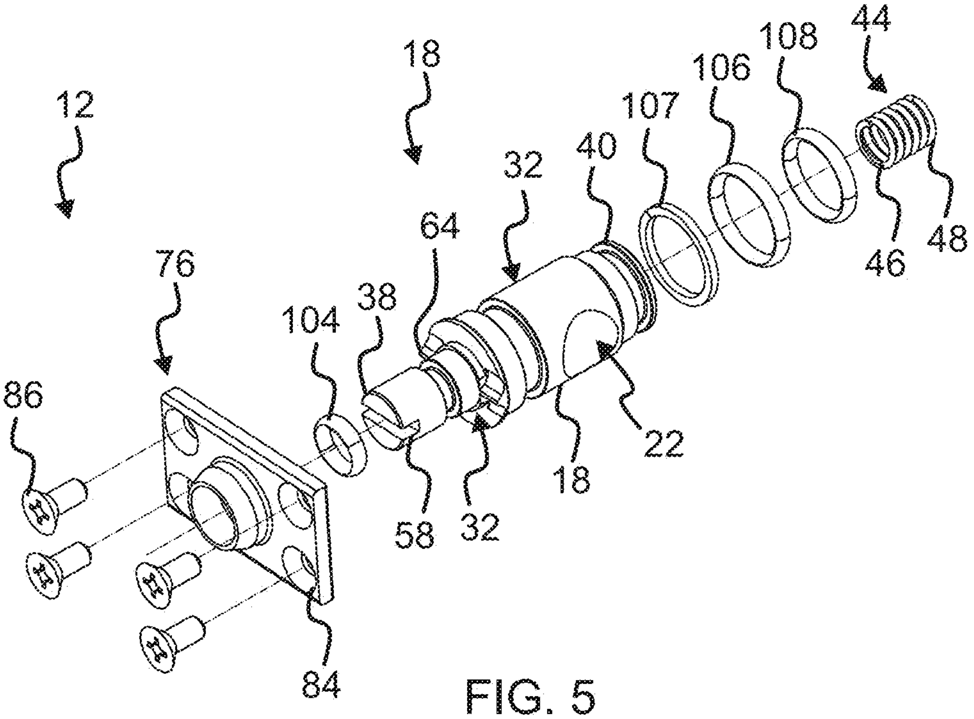
FIG. 5 depicts a front perspective exploded view of a valve of the valve assembly of FIG. 1.
Figure 6:
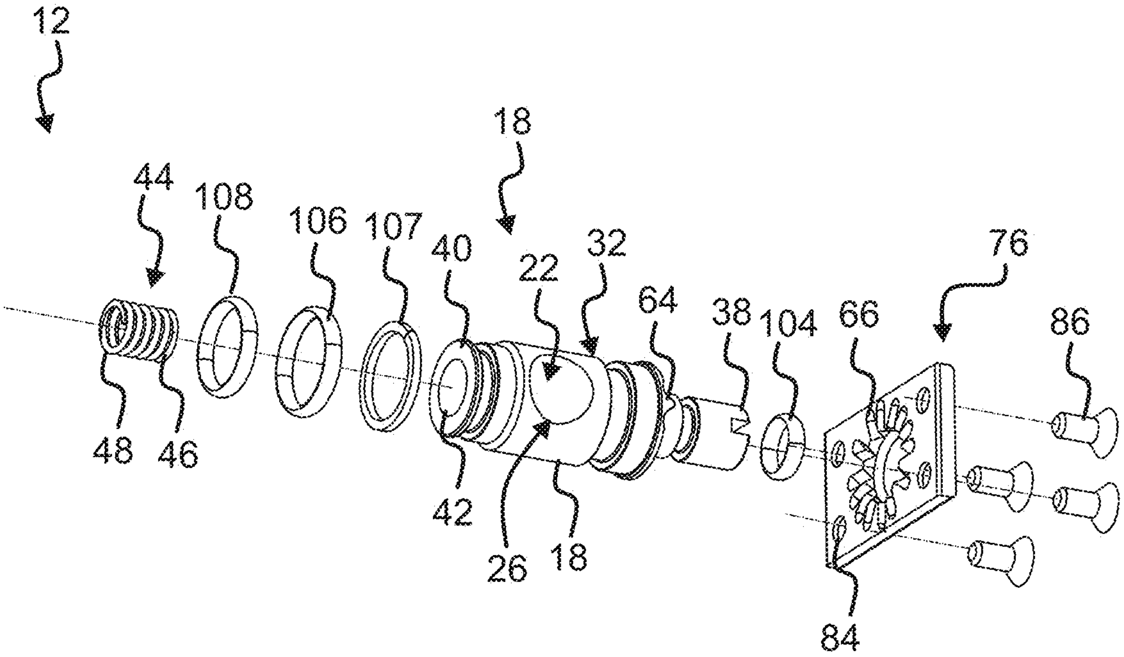
FIG. 6 depicts a rear perspective exploded view of a valve of the valve assembly of FIG. 1.

FIG. 3 depicts a vertical cross-sectional view of a valve 12, and FIG. 4 depicts a horizontal cross-sectional view of a valve 12. FIG. 5 depicts a front perspective exploded view valve 12 without body 14, and FIG. 6 depicts a rear perspective exploded view of valve 12 without body 14. The body 14 defines a cavity (cross-bore) 28, that is oriented perpendicular to the flow passage 20. At least a portion of the valve member 18 is situated within the cavity 28, so that the valve member 18 may rotate about a central axis X and so that an outer surface 32 of the valve member 18 faces an interior surface 30 of the cavity 28. The cavity 28 may include one or more recessed portions 34 to allow for longitudinal/axial movement of the valve member 18 along axis X. The actuated end 38 of the valve member 18 protrudes out of the body 14, and the actuated end 38 may, in some examples, be of a smaller diameter than the portion of the valve member 14 that resides within the cavity 28. The valve member 18 includes a shoulder 36 that has a plate-facing surface 60, which is on a plane perpendicular to axis X. The shoulder 36 faces a valve-facing surface 80 of plate 76.

Actuated end 38 of the valve member 18 includes one or more actuation features 58 (e.g., a torque transfer interface) by which the valve may be adjusted or set to a particular flow rate. In the particular examples illustrated, the actuation feature includes a single channel suitable for insertion and rotation of a tool such as a flathead screwdriver. In other examples, other shapes and features suitable for use of other tools may be contemplated (for example, shapes suitable for a wrench, channel locks, pliers, or other hand tools, power tools, or automated actuation means). In some examples, a hand tool may be utilized to adjust the valve member 18. In other examples, an automated actuator may be used to adjust the valve member 18.

Valve member 18 includes a flow path (bore) 22 that is defined at opposing ends by flow control openings/orifices 26. In some examples, the diameter/width of flow path 22 is the same as the diameter/width of flow passage 20. Flow passage 20 is defined around a flow axis Y that is perpendicular to and intersects the central axis X. Flow path 22 is oriented perpendicular to central axis X. In some examples, flow path 22 and flow passage 22 may be cylindrical, although other shapes may be contemplated. Flow path 22 and flow passage 20 are located and oriented such that in at least one flow position, their paths align and they both are defined around flow axis Y.

Valve member 18 includes a pocket 42 at a spring end 40 of the valve member 18, the spring end 40 being opposite the actuated end 38. The pocket 42 is configured to enclose at least a portion of a biasing member (for example, a spring or other suitable biasing member type) 44. A first end 46 of biasing member 44 contacts (and exerts a spring force FS upon) an end surface 52 of the pocket 42. A second end 48 of biasing member 44 extends past an opening 50 of the pocket 42 and contacts an end surface 54 of the cavity 28. A biasing force, or spring force FS is exerted along axis X. In some examples, the cavity end surface 54 includes a spring contact feature 56 (for example, a bore or pan).

Valve member 18 may include one or more grooves and seal members. In the example shown, valve member 18 includes a first groove 98 (see FIG. 7 and FIG. 8) that circumscribes the valve member 18 toward the actuated end 38. First groove 98 includes a first seal member 104 (for example, an O-ring) that movably seals against a portion of the plate 76. First seal member 104 may be configured so as to prevent environmental contaminants (for example, air, water, vapor, water, oil, sand or other particular, or others) from entering the valve 12 between the plate 7 and the valve member 18. In the example shown, valve member 18 includes a second groove 100 (see FIG. 7 and FIG. 8) that circumscribes the valve member 18 between the shoulder 36 and the flow path 22. Second groove 100 includes a second seal member 106 (for example, an O-ring) that movably seals against the interior surface 30 of the cavity 28. Second seal member 106 may be configured to prevent fluids passing through the flow path 22 from exiting the valve 12 between the body 14 and the valve member 18. In some examples, second groove 100 also includes an additional seal member 107 adjacent to second seal member 106. Additional seal member 107 may be of the same or different type of seal member type as second seal member 106. In some examples, member 107 may be a backing material or back-up ring. In the example shown, valve member 18 includes a third groove 102 (see FIG. 7 and FIG. 8) that circumscribes the valve member 18 between flow path 22 and the spring end 40. Third groove 102 includes a third seal member 108 (for example, an O-ring) that movably seals against the interior surface 30 of the cavity 28. Third seal member 108 may be configured so as to prevent fluids passing through the flow path 22 from entering the space between the spring end 40 of the valve member 18 and the end surface 54 of the cavity 28 (and therefore also the pocket 42), to prevent the pressure of the fluid from acting on the valve member 18 (essentially increasing the force in the direction of the spring force FS). Such pressure may lead to inability to adjust the valve (because the force of the detent teeth 64 against the detent slots 66, described below would be too great), and may lead to valve damage. In some examples, valve 12 is installed in services where the pressure of the valve fluids may be up to or greater than 5,000 pounds per square inch (psi).

In some examples, valve member 12 includes a second flow path 23 that enters through an additional opening in body 14 behind biasing member 44, passes through pocket 42, and intersects with flow path 22. In such an example, the preset flow rates may represent not only an amount of flow, but a ratio of flow between each exit orifice.

Figure 7:
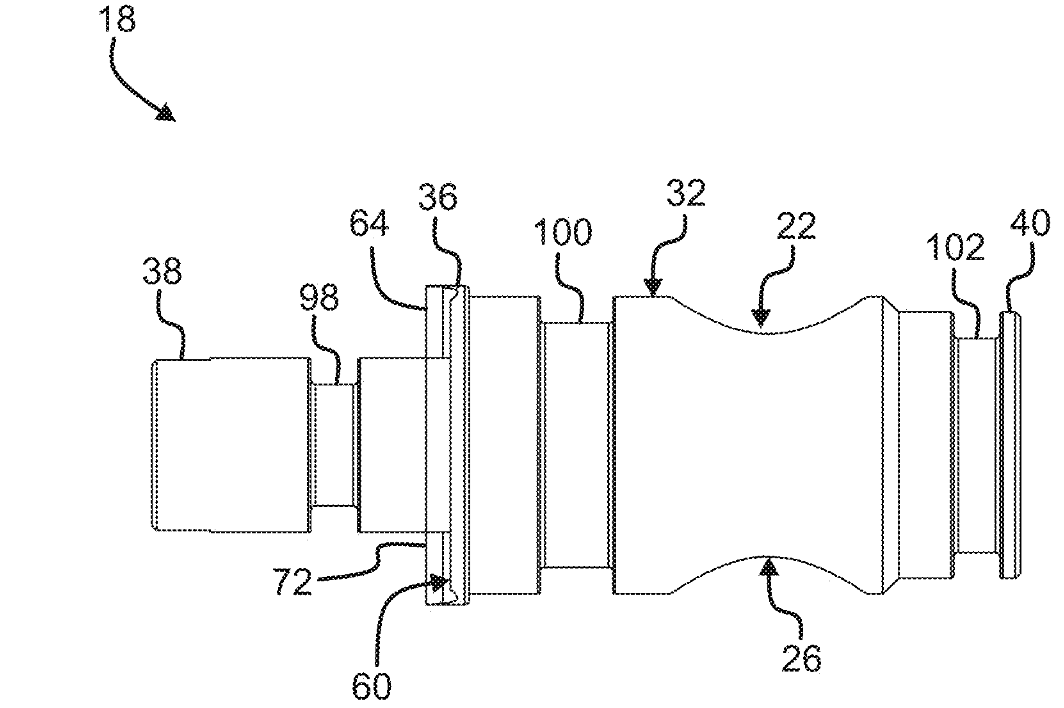
FIG. 7 depicts a top view of a valve member of the valve assembly of FIG. 1.
Figure 8:
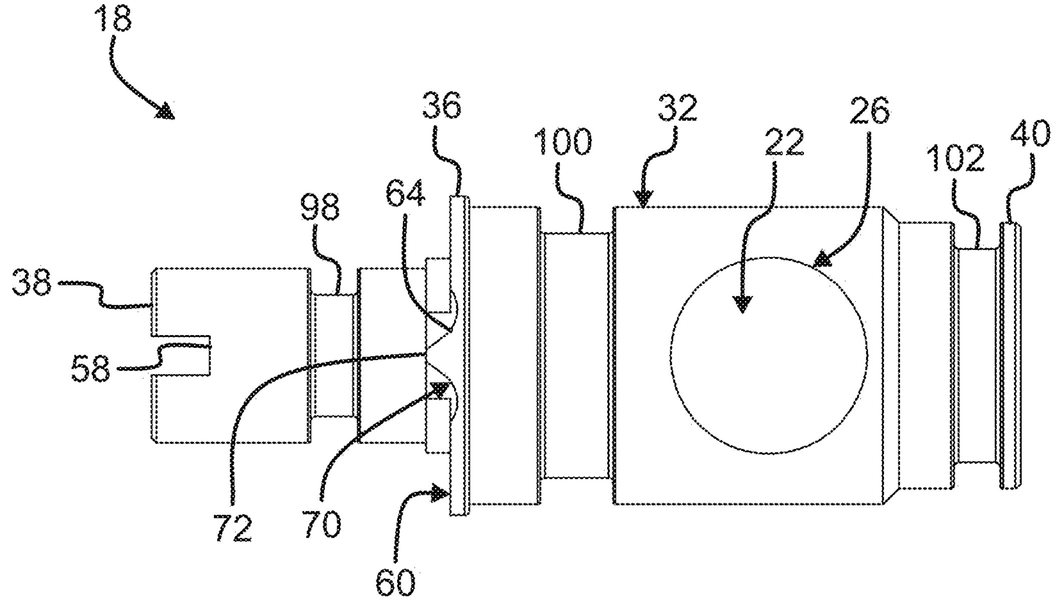
FIG. 8 depicts a side view of a valve member of the valve assembly of FIG. 1.
Figure 9:
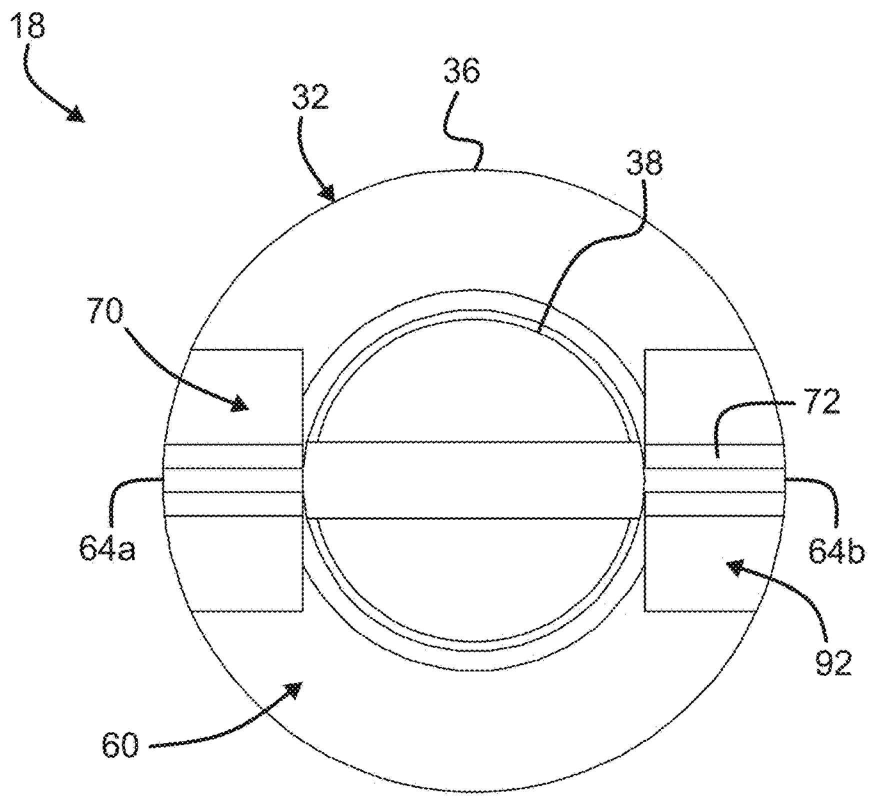
FIG. 9 depicts a front view of a valve member of the valve assembly of FIG. 1.
Figure 10:
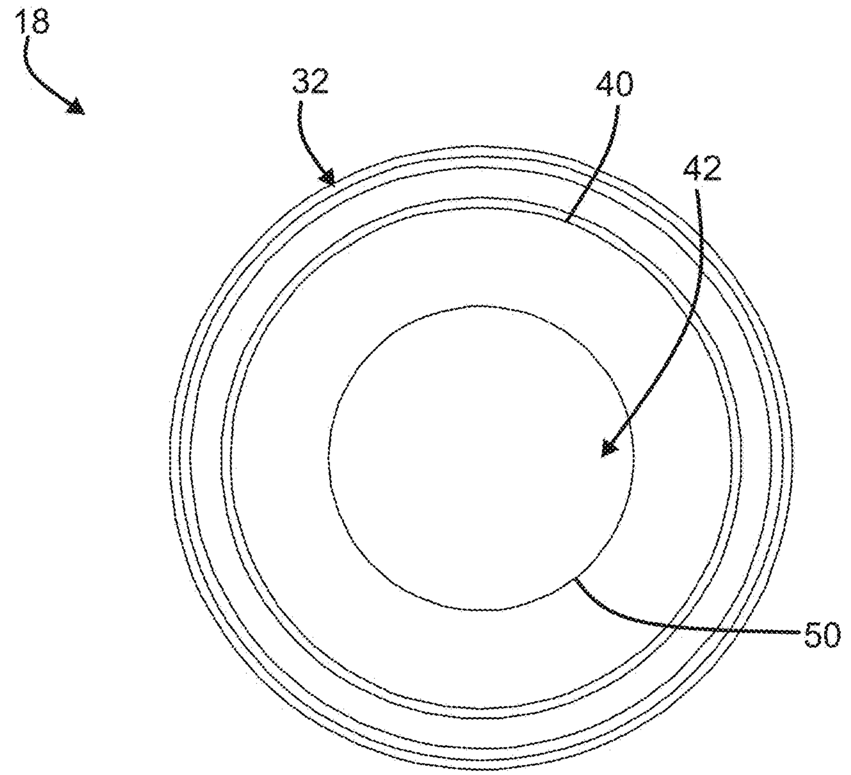
FIG. 10 depicts a rear view of a valve member of the valve assembly of FIG. 1.

FIG. 7 depicts a top view of a valve member 18 of valve 12, FIG. 8 depicts a side view of valve member 18, FIG. 9 depicts a front view of valve member 18, and FIG. 10 depicts a side view of valve member 18. In addition to the features described above, valve member 18 also includes at least one detent tooth 64 that protrudes (along axis X) from plate-facing surface of shoulder 36. Each tooth 64 includes a pair of ramps 70, one on either side of the tooth 64. The tooth 64 may have a peak/upper surface 72 adjacent to the ramps 70 (the ramps 70 converge toward peak/upper surface 72) that is flat as shown, or that may be curved or pointed. Each tooth 64 is oriented radially about and perpendicular to axis X. In the particular example shown, the valve member 18 includes a pair of teeth 64*a*, 64*b*, opposite and in line with one another. Other numbers of and orientations of teeth 64 may occur.

Figure 11:
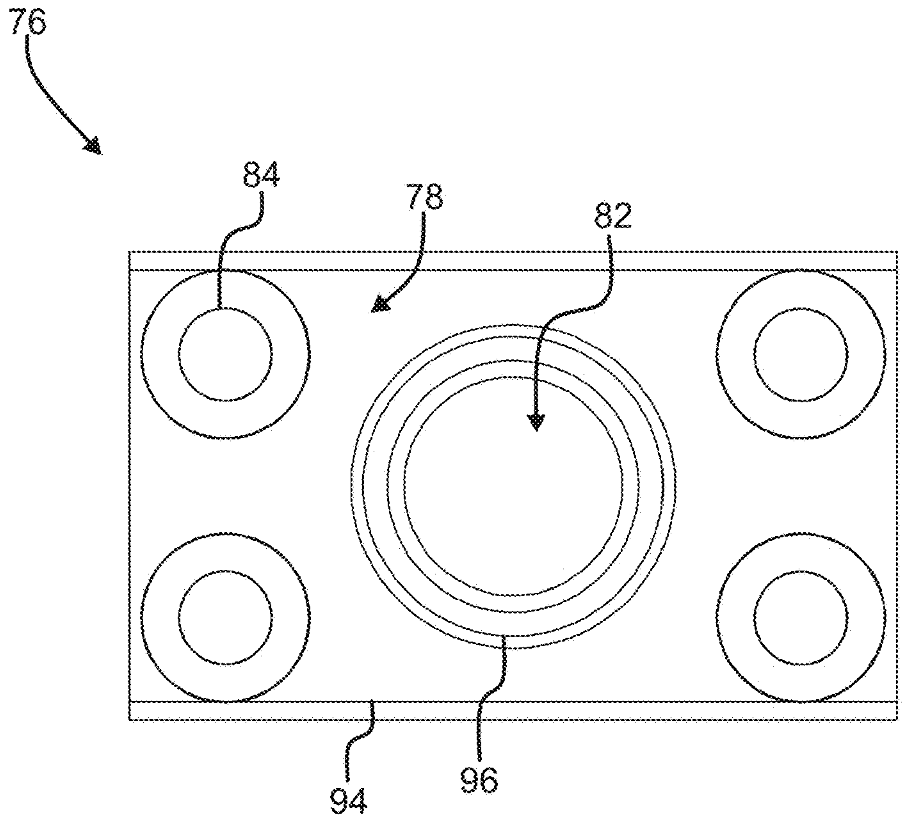
FIG. 11 depicts a front view of a plate of the valve assembly of FIG. 1.
Figure 12:
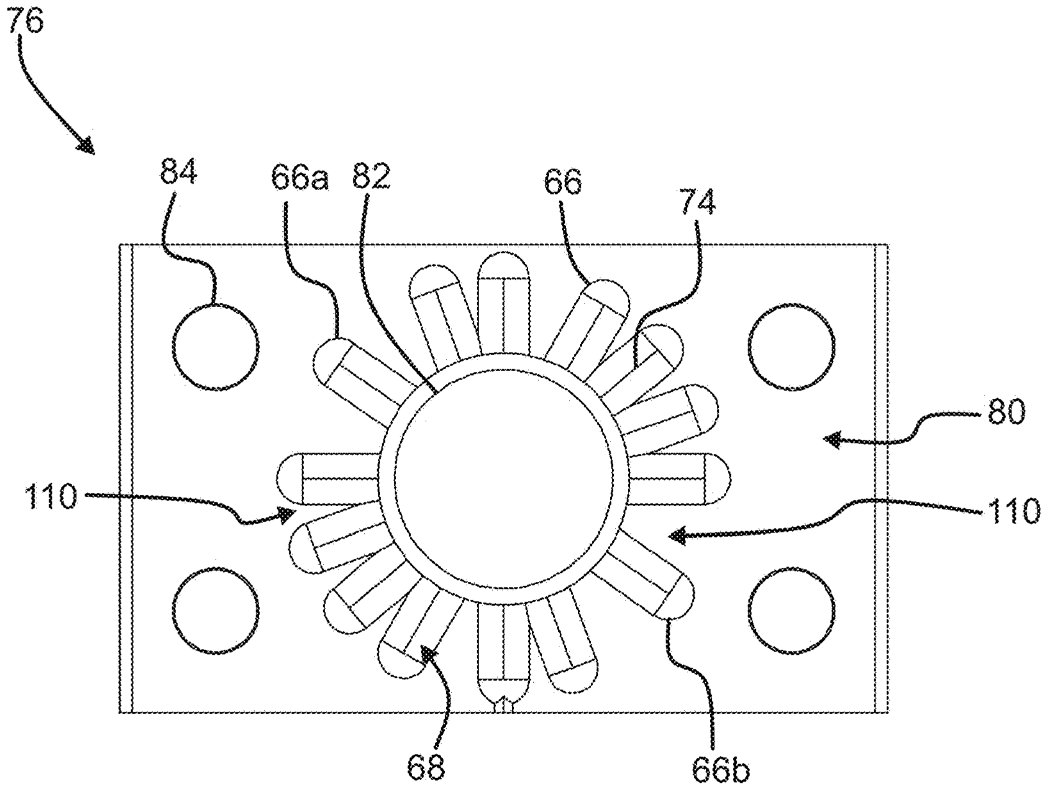
FIG. 12 depicts a rear view of a plate of the valve assembly of FIG. 1.
Figure 13:
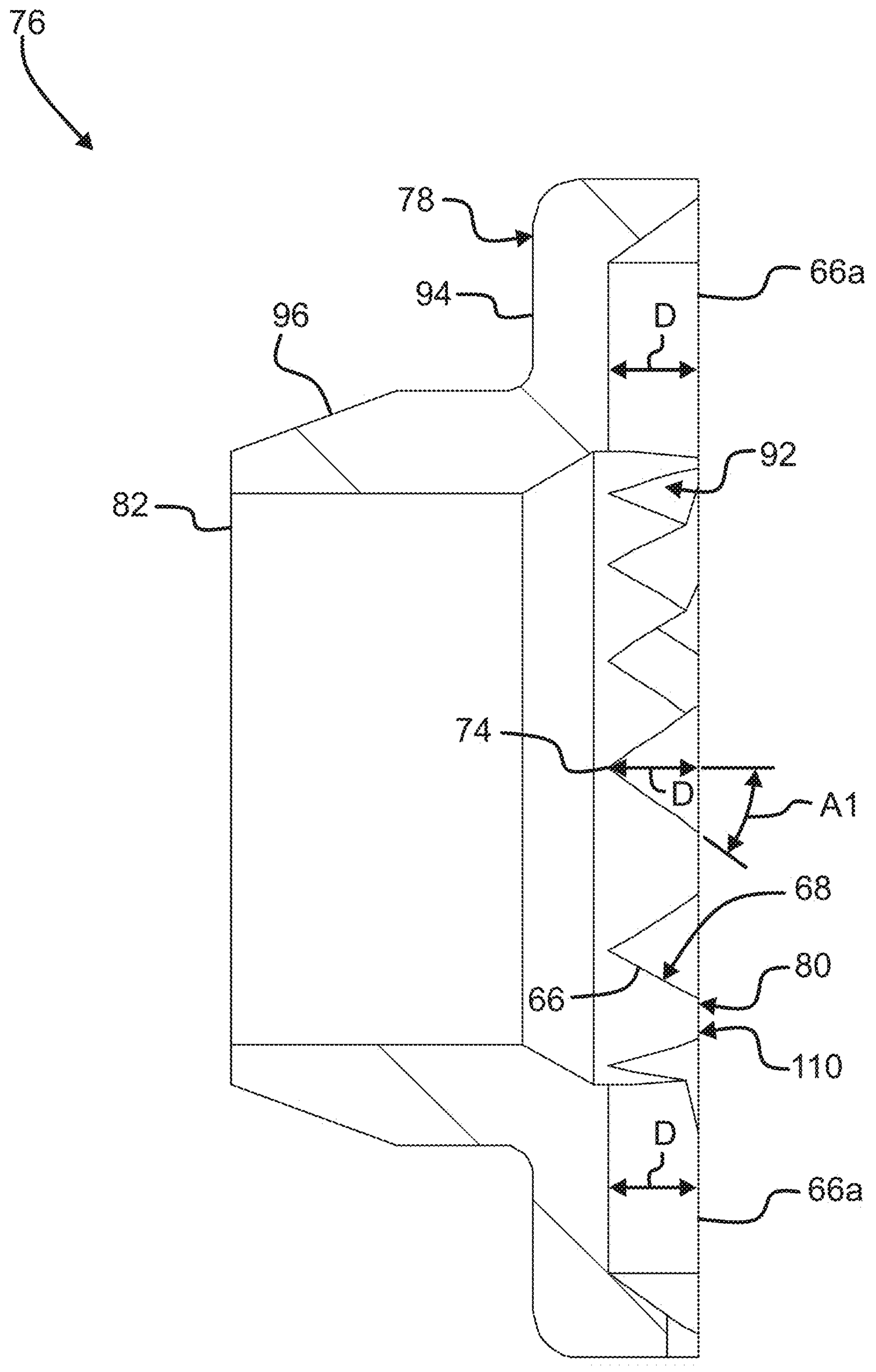
FIG. 13 depicts a cross-sectional view of a plate of the valve assembly of FIG. 1.

FIG. 11 depicts a front view of plate 76 of valve 12, and FIG. 12 depicts a rear view of plate 76. FIG. 13 depicts a cross-sectional view of plate 76. In addition to the features described above, plate 76 includes a cover portion 94 of the plate, that extends substantially perpendicular to the shoulder 36 of valve member 18 and that includes any fastener openings 84 for connection to body 14. Plate 76 also includes a collar portion 96 that extends from an externally-facing surface 78 and surrounds a portion of valve member 18 between the actuated end 38 and the body 14. An interior surface of the collar portion 96 may contact first seal member 104.

Plate 76 includes a plurality of detent slots 66 that are recessed into the valve-facing surface 80 and are arranged radially around the rod opening 82 and around axis X. The radially-extending detent slots 66 may be arranged in a dial configuration, such that the face of the dial on surface 80 is perpendicular to axis X and the slots 66 extend radially to the outer circumference of the dial configuration. In some examples, the slots 66 are arranged in pairs of slots 66*a*, 66*b* that are in line with an opposite each other (e.g. located on opposite sides of the face of the dial configuration). Other numbers of and orientations of slots 66 may occur. Each slot 66 includes a pair of ramps 68, one on either side of the slot 66. Each slot 66 may have a peak/upper surface 74 adjacent to the ramps 68 that is peaked as shown (the ramps 68 converge toward peak/upper surface 74), or that may be curved or flat. Each slot 66 is defined by a depth D from the valve-facing surface 80 to its peak 74. In some examples, depth D may be about 0.045 in. In some examples, depth D may be between about 0.030 in. and about 0.060 in. In some examples, depth D may be between about 0.020 in. and about 0.080 in. In some examples, depth D may be between about 0.040 in. and about 0.100 in. In some examples, depth D may be less than about 0.045 in. In some examples, depth D may be greater than about 0.045 in. Each slot 66 or pair of associated detent slot 66*a*, 66*b* has a defined angle A1 of its slot ramps 68. In some examples, A1 may equal about 30°. In some examples, A1 may be between about 15° and 45°. In some examples, A1 may be between about 20° and 40°. In some examples, A1 may be between about 25° and 35°. In some examples, A1 may be less than 30°. In some examples, A1 may be greater than 30°. In some examples, the slot ramps 68 on either side of the slot 66 are symmetrical (have the same angle). In some examples, the spaces of surface 80 located between the ramps 68 of adjacent slots 66 define crests 110 that are part of and planar with surface 80.

Figure 14:
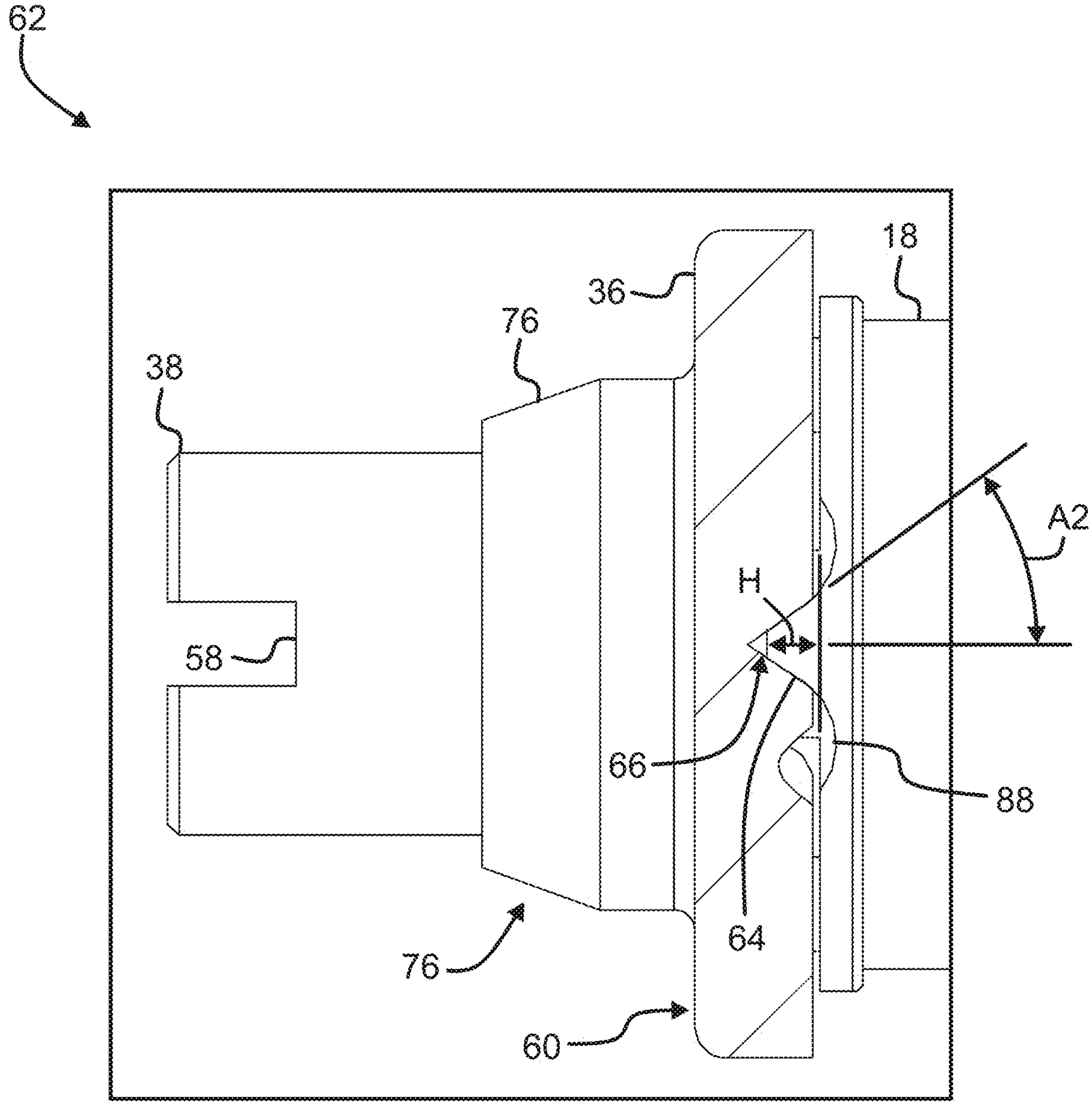
FIG. 14 depicts a side view and partial cross-sectional view of the valve assembly of FIG. 1, illustrating an engaged detent mechanism.

FIG. 14 depicts a side view and partial cross-sectional view (a partial cross-section of plate 76 is shown to illustrate the fit of a tooth 64 engaged within a slot 66) of the valve assembly 10, illustrating an engaged detent mechanism 62. The detent mechanism 62 includes the detent slots 66 and detent teeth 64. Each slot 66 or pair of associated slots 66*a*, 66*b* is configured to receive the tooth 64 or pair of teeth 64*a*, 64*b*. Each slot 66 or pair of slots 66*a*, 66*b* corresponds to a pre-set flow rate through valve 12. When the valve member 18 is rotated about axis X via actuation feature 58, the tooth 64 or pair of teeth 64*a*, 64*b* may be engaged with a selected slot 66 or pair of slots 66*a*, 66*b* to select the associated flow rate through the valve 12. Examples including pairs of slots 66*a*, 66*b* and teeth 64*a*, 64*b* may provide more robust and sturdy engagement between the slots 66 and teeth 64 that are less likely to be bumped, vibrated, or otherwise unintentionally moved out of engagement.

Each tooth 64 is defined by a height H from the plate-facing surface 60 of shoulder 36 to its peak 72. Each tooth 64 or pair of associated teeth 64*a*, 64*b* has a defined angle A2 of its tooth ramps 70. In some examples, the tooth ramps 70 on either side of the tooth 70 are symmetrical (have the same angle). In some examples, tooth height H is less than or equal to slot depth D, depending on the geometry of the tooth 64 and the slot 66. In some examples, height H may be about 0.045 in. In some examples, height H may be between about 0.030 in. and about 0.060 in. In some examples, height H may be between about 0.020 in. and about 0.080 in. In some examples, height H may be between about 0.040 in. and about 0.100 in. In some examples, height H may be less than about 0.045 in. In some examples, height H may be greater than about 0.045 in. In some examples, slot ramp angle A1 is equal to the tooth ramp angle A2, to allow for a secure fit of the tooth 64 within the slot 66. In some examples, A2 may be between about 15° and 45°. In some examples, A2 may be between about 20° and 40°. In some examples, A2 may be between about 25° and 35°. In some examples, A2 may be less than 30°. In some examples, A2 may be greater than 30°. In some examples, tooth 64 extends from a flat plane of surface 60. In other examples as shown, surface 60 includes a curved recess adjacent to each ramp 70 of tooth 64.

In some examples, slots 66 are recessed into the shoulder 36 of the valve member 18, and the teeth 64 are present on valve-facing surface 80 of the plate 76.

Figure 15:
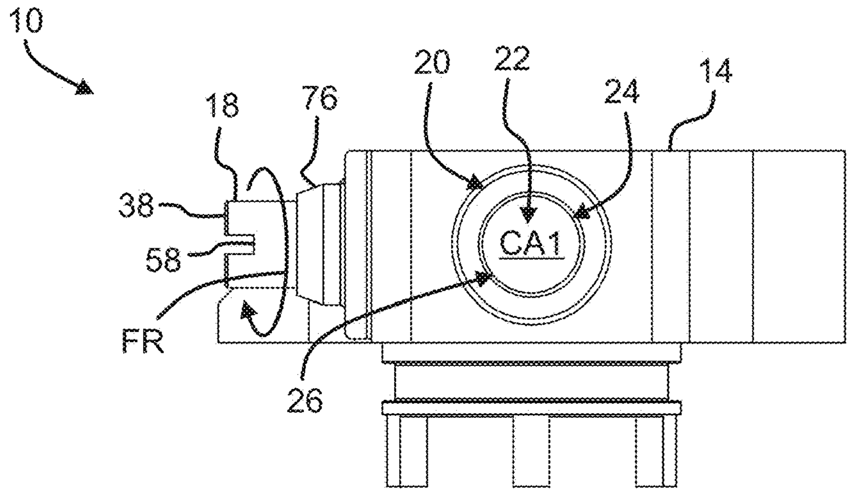
FIG. 15 depicts a side view of the valve assembly of FIG. 1, illustrating an open flow path.

FIG. 15 depicts a side view of the valve assembly 10, illustrating an open flow pathway. In this configuration, the detent mechanism 62 is engaged so that teeth 64 are engaged with corresponding slots 66 that correspond to a fully open flow rate position, in which the flow path 22 of valve member 18 is fully in line with flow passage 20 of body 14 along axis Y. In this position, the cross-sectional area CA1 through which fluid may flow is equal to the cross-sectional area of 26.

In an example, a rotational force FR is applied to the actuation end 38 of valve member 18. As the rotational force FR is applied, the geometry of ramps 68, 70 allows the tooth outer surface 92 to slide against the slot inner surface 90, thereby disengaging the detent mechanism 62. As rotational force FR, and therefore an associated torque is applied to the valve member 18, the interface of the ramps 68/70 converts at least some of the rotational torque into an axial force that acts in a direction opposite spring force FS parallel to axis X and is sufficient to overcome spring force FS. Thus, as outer surface 92 slides against the slot inner surface 90 and the tooth 64 slides out of slot 66, the valve member 18 is moved axially against spring force FS (in some examples, so that the spring end 40 of the valve member 18 contacts the cavity end surface 54). As the rotational force FR continues to be applied, and the tooth 64 slides to an adjacent slot 66, the biasing spring force FS biases the tooth outer surface 92 against the slot inner surface 90 of the adjacent slot 66, thereby reengaging the detent mechanism 62 into a different, partially open flow position.

The biasing strength of the biasing member 44 may be configured such that the geometry of ramps 68, 70 allows for disengagement without requiring the application of an axial force FA (see FIG. 3) while also being strong enough so that the spring force FS maintains the engagement of detent mechanism 62 even when valve 12 is subject to harsh environmental conditions. Although application of axial force FA is not required, if axial force FA is applied, the valve member 18 will be pushed against spring force FA, and may be rotated around axis X by additional application of a rotational force FR. This may result in less friction between outer surface 92 and slot inner surface 90 as the valve is adjusted.

In some examples, the biasing member 44 and the geometry of ramps 68, 70 are configured such that a minimum amount of torque is required in order to rotate the valve member 18 from a first flow position to a second flow position. The required minimum amount of torque may ensure that the valve member 18 may be rotated by the designated means (for example, by a user with a hand tool or a mechanical actuation), while also providing robust and sturdy engagement between the slots 66 and teeth 64 to prevent them from being bumped, vibrated, or otherwise unintentionally moved out of engagement. In some examples, the minimum amount of torque required to rotate the valve member 18 is about 5 inch-pounds. In some examples, the minimum amount of torque required to rotate the valve member 18 is about 6 inch-pounds. In some examples, the minimum amount of torque required to rotate the valve member 18 is between about 5 inch-pounds and about 6 inch-pounds. In some examples, the minimum amount of torque required to rotate the valve member 18 is between about 4 inch-pounds and about 7 inch-pounds. In some examples, the minimum amount of torque required to rotate the valve member 18 is between about 3 inch-pounds and about 8 inch-pounds. In some examples, the minimum amount of torque required to rotate the valve member 18 is between about 5 inch-pounds and about 10 inch-pounds. In some examples, the minimum amount of torque required to rotate the valve member 18 is between about 6 inch-pounds and about 12 inch-pounds. In some examples, the minimum amount of torque required to rotate the valve member 18 is greater than about 5 inch-pounds. In some examples, the minimum amount of torque required to rotate the valve member 18 is greater than about 6 inch-pounds. In some examples, the minimum amount of torque required to rotate the valve member 18 is less than about 5 inch-pounds. In some examples, the minimum amount of torque required to rotate the valve member 18 is less than about 6 inch-pounds.

Figure 16:
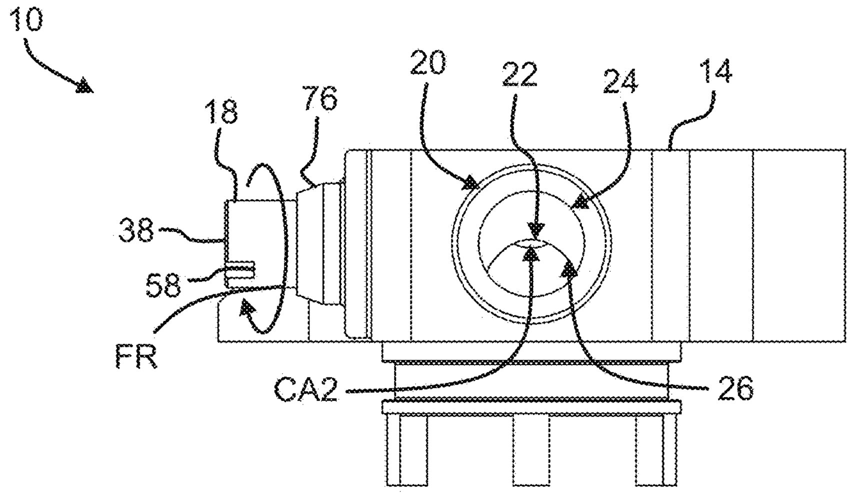
FIG. 16 depicts a side view of the valve assembly of FIG. 1, illustrating a partially open flow path.

FIG. 16 depicts a side view of the valve assembly 10, illustrating a partially open flow pathway. The rotation of the valve member 18 into the different, partially open flow position causes the flow path 22 of valve member 18 to be only partially open to flow passage 20 of body 14. In this position, the cross-sectional area CA2 through which fluid may flow is less than the cross-sectional area of 26. Valve 12 may include one or more selectable flow rate positions that correspond to varying cross-sectional flow areas.

Figure 17:
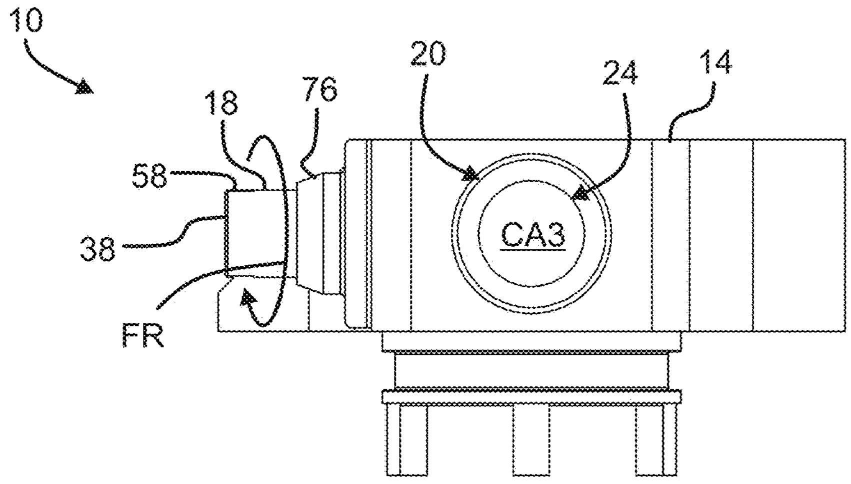
FIG. 17 depicts a side view of the valve assembly of FIG. 1, illustrating a closed flow path.

In an example, a rotational force FR may again be applied to the actuation end 38 of valve member 18, to disengage the detent mechanism 62 from this position and to reengage the detent mechanism 62 into a new flow position, as described above. In an example, valve 12 may include at least one flow rate position that corresponds to a closed flow pathway. FIG. 17 depicts a side view of the valve assembly 10, illustrating a closed flow pathway. In the closed pathway position, no open part of the flow path 22 of valve member 18 is open to any part flow passage 20 of body 14. In this position, the cross-sectional area CA3 of the flow opening 24 (of the flow passage 20) is completely blocked and no fluid may flow through flow path 22.

In some examples, the only non-fluid forces applied within the system of valve 12 are rotational force FR, axial force FA, and spring force FS. In these examples, there are no non-fluid forces acting in a direction that is perpendicular to axis X (e.g. a side force). This may lead to a more robust and stable valve design that can better withstand harsh operating environments, as unbalanced side forces may cause misalignment, breaking of seals, stress, and wear on the valve 12 system.

Figure 18:
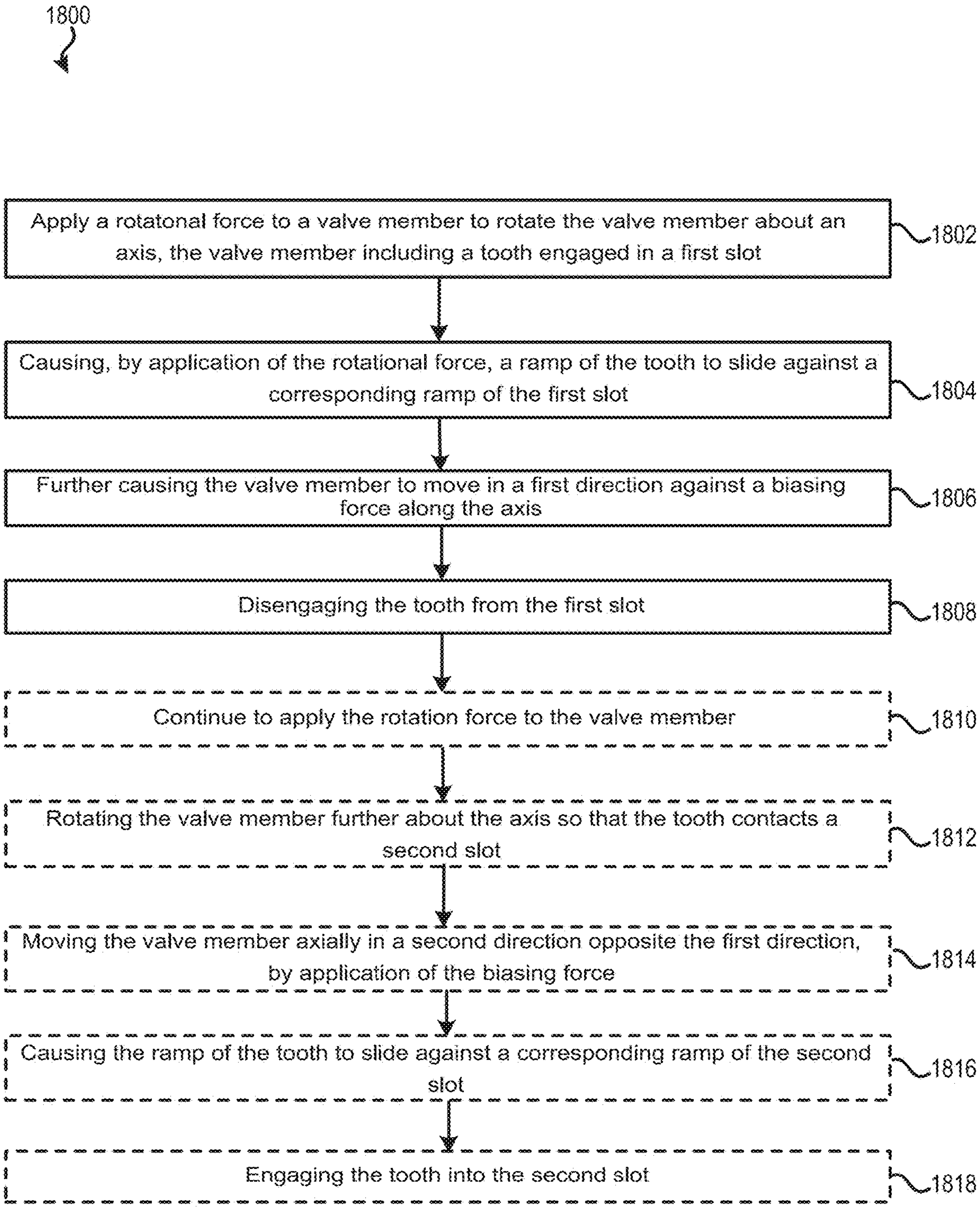
FIG. 18 depicts a method for selecting a flow path in a selectable variable orifice valve, according to an example.

FIG. 18 depicts an example method for selecting a flow path in a selectable variable orifice valve. At operation 1802, a rotational force is applied to a valve member to rotate the valve member about an axis. The valve member includes a tooth that is initially engaged into a first slot of the selectable variable orifice valve, corresponding to a first selected flow path position.

At operation 1804, application of the rotational force causes a ramp of the tooth to side against a corresponding ramp of the first slot.

At operation 1806, application of the rotational force further causes the valve member to move in a first direction against a biasing force along the axis.

At operation 1808, the tooth is disengaged from the first slot.

At operation 1810, the rotational force is continued to be applied to the valve member.

At operation 1812, application of the rotational force includes rotating the valve member further about the axis so that at least a portion of the tooth contacts at least a portion of a second slot.

At operation 1814, the valve member is moved axially in a second direction opposite the first direction, by application of the biasing force. For example, the biasing force may be applied by a spring or other biasing member.

At operation 1816, the ramp of the tooth is caused to slide against a corresponding ramp of the second slot.

At operation 1818, the tooth is engaged into the second slot. This places the selectable variable orifice valve into a second selected flow path position.

For the purposes of this application, directional terms such as "upper," "lower," "upward," and "downward" are intended to be descriptive with reference to the disclosure above and, where applicable, in relation to the orientation shown in the Figures for clarity. The examples as practiced and included in the scope of the claims may include examples where the systems and devices are in a different orientation.

Unless defined otherwise, all technical and scientific terms used herein have the same meaning as those commonly understood to one of ordinary skill in the art to which this invention pertains.

As used herein and in the claims, the singular forms "a," "an", and "the" include the plural reference unless the context clearly indicates otherwise.

While particular uses of the technology have been illustrated and discussed above, the disclosed technology can be used with a variety of environments in accordance with many examples of the technology. The above discussion is not meant to suggest that the disclosed technology is only suitable for implementation within the environments shown and described above. As should be appreciated, the various aspects described with respect to the figures herein are not intended to limit the technology to the particular aspects described. Accordingly, additional configurations can be used to practice the technology herein and/or some aspects described can be excluded without departing from the methods and systems disclosed herein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Illustrative examples of the systems and methods described herein are provided below. An embodiment of the system or method described herein may include any one or more, and any combination of, the aspects described below:

Aspect 1. A valve arrangement comprising: a valve housing defining a flow passage and a cross-bore that extends across the flow passage, the cross-bore defining a central axis, the cross-bore having first and second opposite ends positioned on opposite sides of the flow passage; a valve member that mounts within the cross-bore and that is rotatable within the cross-bore about the central axis of the cross-bore, the valve member defining a flow-control opening for controlling flow through the flow passage across the cross-bore, the valve member being rotatable about the central axis to vary a cross-sectional area of the flow-control opening that is available for permitting flow through the flow passage, the valve member rotatable about the central axis between a plurality of detent positions corresponding to different flow levels; a biasing member positioned adjacent the first end of the cross-bore for applying a biasing force to the valve member in an axial direction along the central axis such that the valve member is biased toward the second end of the cross-bore; and a detent arrangement that defines the detent positions, the detent arrangement including a ramp interface configured such that when a predetermined level of torque is applied to the valve member about the central axis the ramp interface converts the torque into sufficient axial force to overcome the biasing force applied by the biasing member causing the valve member to move along the central axis in a direction toward the first end of the cross-bore to allow the valve member to move from a first detent position to a second detent position.

Aspect 2. The valve arrangement of aspect 1, wherein the detent arrangement includes first and second portions positioned on opposite sides of the central axis.

Aspect 3. The valve arrangement of any of aspects 1-2, wherein the detent arrangement comprises at least one tooth and at least one slot, each tooth comprising a first ramp arrangement of the ramp interface and each slot comprising a second ramp arrangement of the ramp interface.

Aspect 4. The valve arrangement of aspect 3, wherein the first ramp arrangement is defined by a first ramp angle, wherein the second ramp arrangement is defined by a second ramp angle, and wherein the first ramp angle is equal to the second ramp angle.

Aspect 5. The valve arrangement of any of aspects 3-4, wherein the at least one tooth is defined by a maximum height, wherein the at least one slot is defined by a maximum depth, and wherein the maximum depth of the at least one slot is greater than or equal to the maximum height of the tooth.

Aspect 6. The valve arrangement of any of aspects 3-5, wherein: the at least one slot includes a plurality of slots, the plurality of slots is arranged in a dial configuration, the face of the dial configuration is perpendicular to the central axis, each of the plurality of slots extends radially to an outer circumference of the dial, and each of the plurality of slots includes first and second radial portions positioned on opposite sides of the face of the dial.

Aspect 7. The valve arrangement of any of aspects 3-6, wherein the at least one slot is defined by a first ramp surface of the second ramp arrangement and a second ramp surface of the second ramp arrangement that converge toward a peak of the at least one slot.

Aspect 8. The valve arrangement of aspect 7, further comprising a plurality of slots, wherein each of the plurality of slots are separated from adjacent slots by crests defined between ramp surfaces of the adjacent slots.

Aspect 9. The valve arrangement of any of aspects 3-8, wherein the at least one tooth is defined by a first ramp surface of the first ramp arrangement and a second ramp surface of the first ramp arrangement that converge toward a peak of the at least one tooth.

Aspect 10. The valve arrangement of aspect 9, wherein the at least one tooth includes a pair of teeth, each of the pair of teeth extends radially away from the central axis, and the pair of teeth comprise first and second radial portions positioned on opposite sides of the central axis.

Aspect 11. The valve arrangement of any of aspects 1-10, wherein the valve housing comprises a main housing body and a detent plate that attaches to the main housing body.

Aspect 12. The valve arrangement of any of aspects 1-11, further comprising at least one seal member, the at least one seal member circumscribing the valve member between the flow control opening and the biasing member.

Aspect 13. The valve arrangement of any of aspects 1-12, wherein the flow passage defines a flow passage axis, and wherein the flow passage axis is perpendicular to the central axis.

Aspect 14. The valve arrangement of aspect 13, wherein: the flow control opening defines a flow control axis, and at least one of the plurality of detent positions corresponds to a maximum flow level, whereat the flow control axis is aligned with the flow passage axis and the cross-sectional area of the flow-control opening that is available for permitting flow through the flow passage is maximized.

Aspect 15. The valve arrangement of aspect 13, wherein: the flow control opening defines a flow control axis, and at least one of the plurality of detent positions corresponds to a no-flow level, whereat the flow control axis is perpendicular to the flow passage axis and none of the cross-sectional area of the flow-control opening is available for permitting flow through the flow passage.

Although specific aspects were described herein, the scope of the technology is not limited to those specific aspects. One skilled in the art will recognize other aspects or improvements that are within the scope of the present technology. Therefore, the specific structure, acts, or operations are disclosed only as illustrative aspects. The scope of the technology is defined by the following claims and any equivalents therein.

What is claimed is:

1. A valve arrangement comprising:

a valve housing defining a flow passage and a cross-bore that extends across the flow passage, the cross-bore defining a central axis, the cross-bore having first and second opposite ends positioned on opposite sides of the flow passage;

a valve member that mounts within the cross-bore and that is rotatable within the cross-bore about the central axis of the cross-bore, the valve member defining a flow-control opening for controlling flow through the flow passage across the cross-bore, the valve member being rotatable about the central axis to vary a cross-sectional area of the flow-control opening that is available for permitting flow through the flow passage, the valve member rotatable about the central axis between a plurality of detent positions, corresponding to different flow levels;

a spring positioned adjacent the first end of the cross-bore for applying a biasing force to the valve member in an axial direction along the central axis such that the valve member is biased toward the second end of the cross-bore; and a detent arrangement that defines the detent positions, the detent arrangement including a ramp interface configured such that when a predetermined level of torque is applied to the valve member about the central axis the ramp interface converts the torque into sufficient axial force to overcome the biasing force applied by the spring causing the valve member to move along the central axis in a direction toward the first end of the cross-bore to allow the valve member to move from a first detent position to a second detent position, wherein at least one of the first detent position and the second detent position defines a partial flow-control opening.

2. The valve arrangement of claim 1, wherein the detent arrangement includes first and second portions positioned on opposite sides of the central axis.

3. The valve arrangement of claim 1, wherein the detent arrangement comprises at least one tooth and at least one slot, each tooth comprising a first ramp arrangement of the ramp interface and each slot comprising a second ramp arrangement of the ramp interface.

4. The valve arrangement of claim 3, wherein the first ramp arrangement is defined by a first ramp angle, wherein the second ramp arrangement is defined by a second ramp angle, and wherein the first ramp angle is equal to the second ramp angle.

5. The valve arrangement of claim 3, wherein the at least one tooth is defined by a maximum height, wherein the at least one slot is defined by a maximum depth, and wherein the maximum depth of the at least one slot is greater than or equal to the maximum height of the tooth.

6. The valve arrangement of claim 3, wherein:

the at least one slot includes a plurality of slots, the plurality of slots is arranged in a dial configuration, the face of the dial configuration is perpendicular to the central axis, each of the plurality of slots extends radially to an outer circumference of the dial, and each of the plurality of slots includes first and second radial portions positioned on opposite sides of the face of the dial.

7. The valve arrangement of claim 3, wherein the at least one slot is defined by a first ramp surface of the second ramp arrangement and a second ramp surface of the second ramp arrangement that converge toward a peak of the at least one slot.

8. The valve arrangement of claim 7, further comprising a plurality of slots, wherein each of the plurality of slots are separated from adjacent slots by crests defined between ramp surfaces of the adjacent slots.

9. The valve arrangement of claim 3, wherein the at least one tooth is defined by a first ramp surface of the first ramp arrangement and a second ramp surface of the first ramp arrangement that converge toward a peak of the at least one tooth.

10. The valve arrangement of claim 9, wherein the at least one tooth includes a pair of teeth, each of the pair of teeth extends radially away from the central axis, and the pair of teeth comprise first and second radial portions positioned on opposite sides of the central axis.

11. The valve arrangement of claim 1, wherein the valve housing comprises a main housing body and a detent plate that attaches to the main housing body.

12. The valve arrangement of claim 1, further comprising at least one seal member, the at least one seal member circumscribing the valve member between the flow control opening and the spring.

13. The valve arrangement of claim 1, wherein the flow passage defines a flow passage axis, and wherein the flow passage axis is perpendicular to the central axis.

14. The valve arrangement of claim 13, wherein:

the flow control opening defines a flow control axis, and at least one of the plurality of detent positions corresponds to a maximum flow level, whereat the flow control axis is aligned with the flow passage axis and the cross-sectional area of the flow-control opening that is available for permitting flow through the flow passage is maximized.

15. The valve arrangement of claim 13, wherein:

the flow control opening defines a flow control axis, and at least one of the plurality of detent positions corresponds to a no-flow level, whereat the flow control axis is perpendicular to the flow passage axis and none of the cross-sectional area of the flow-control opening is available for permitting flow through the flow passage.

16. The valve arrangement of claim 1, wherein the detent arrangement includes more than two detent positions that define different partial flow-control openings corresponding to different flow levels.

17. The valve arrangement of claim 1, wherein the detent arrangement includes more than ten detent positions that define different partial flow-control openings corresponding to different flow levels.

* * * * *